United States Patent
Lindsey

[15] 3,657,694
[45] Apr. 18, 1972

[54] DATA INSERTION SYSTEM
[72] Inventor: James M. Lindsey, Houston, Tex.
[22] Filed: Nov. 21, 1969
[21] Appl. No.: 879,008

[52] U.S. Cl. ..............................340/15.5 BH, 340/18 CM
[51] Int. Cl. ...........................................................G01v 1/22
[58] Field of Search.............340/18 LD, 18 CM, 18 P, 15.5, 340/15.5 TC, 15.5 BH

[56] References Cited

UNITED STATES PATENTS

| | | | |
|---|---|---|---|
| 3,216,524 | 11/1965 | Summers | 340/18 |
| 3,311,876 | 3/1967 | Lee | 340/18 |
| 3,368,195 | 2/1968 | Peterson | 340/18 |
| 3,302,165 | 1/1967 | Anderson et al | 340/18 |

Primary Examiner—Richard A. Farley
Assistant Examiner—N. Moskowitz
Attorney—George L. Church, Donald R. Johnson, Wilmer E. McCorquodale, Jr. and John E. Holder

[57] ABSTRACT

The particular embodiment described herein as illustrative of one form of the invention utilizes an instrument system for detecting parameters of borehole conditions and storing data bits indicative of such parameters. A scan circuit determines the presence or absence of such stored data bits and causes a bit insert circuit to superimpose corresponding data pulses on a conductor supplying line power from the surface to the instrument system in the borehole. A synchronization pulse is also superimposed on the line power to distinguish series of data bits. Surface equipment separates the data and synchronization pulses from the line power and utilizes such data pulses for computing wellbore conditions.

16 Claims, 4 Drawing Figures

Patented April 18, 1972

INVENTOR
JAMES M. LINDSEY

*John E. Holder*

ATTORNEY

INVENTOR
JAMES M. LINDSEY

John E. Holder

ATTORNEY

INVENTOR
JAMES M. LINDSEY

ATTORNEY

DATA INSERTION SYSTEM

BACKGROUND OF THE INVENTION

This invention relates to a data transmission system, and more particularly to a system for inserting logic on a conductor carrying other signals and transmitting such logic to a spaced location.

During the drilling of boreholes in the earth, it is often desirable to determine characteristics of borehole conditions, such as, for example, the attitude of the hole, not only at the bottom of the hole, but throughout its traverse of the earth formations. Various systems have been devised for determining borehole conditions, and normally consist of apparatus for measuring different parameters indicative of such conditions and apparatus for recording such measured parameters or for transmitting signals indicative of such measured parameters to the surface. If data is recorded in the borehole instrument, then the instrument package must be retrieved to the surface before the data may be read out and transformed into some form which is either readable by the human eye or capable of use in computation equipment.

A typical example of such a system would be an apparatus for making determinations of the position or attitude of a borehole, and consisting of angular units for measuring the angular deviation of the borehole from the vertical and directional units for determining the azimuthal direction of inclination of the borehole. Typically such a system also incorporates a photographic device of some sort for making a photographic recording of the instrument readings in the wellbore. In the past, such instruments have been run on wirelines or go-deviled into the drill pipe, where they are subsequently retrieved as in the latter case, by removing the drill pipe from the borehole. Upon retrieval of the instrument to the surface, the photographic equipment is removed, and the exposed film record of the instrument recordings is also removed to a suitable location for developing the film. Thereafter, if calculations are to be made regarding the orientation of the borehole, such information derived from the film can then be utilized in computation equipment for making such determinations. In any event, the procedure outlined above is time consuming, and if decisions for continuing drilling or for making changes in the orientation of the wellbore are required, then such decisions must be held in abeyance until the film is developed and computations can be made from the indicated parameters of the wellbore. In other borehole instrument systems, multiple conductor cables are used to power instruments and transmit data to the surface representative of the instrument functions. The number of conductors of course, is determinative of the size and cost of conductor lines.

It is an object of the present invention to provide a new and improved system for transmitting logic over a conductor.

SUMMARY OF THE INVENTION

With this and other objects in view, the present invention contemplates a system for receiving logic information and transmitting such information over conductors to a spaced location. The logic data is stored. A system scans the storage for the presence or absence of such logic, and supplies a signal indicative of such presence of absence, which in turn is used to generate a pulse corresponding to such signal. This logic pulse is applied to a conductor used for supplying line power to associated systems. The logic data pulse is superimposed upon the line power and then transmitted over a distance where it is separated from the line power signal for utilization of such logic data.

A complete understanding of this invention may be had by reference to the following detailed description, when considered in conjunction with the accompanying drawings, illustrating embodiments thereof.

DESCRIPTION OF THE PREFERRED EMBODIMENTS

Figure 1:
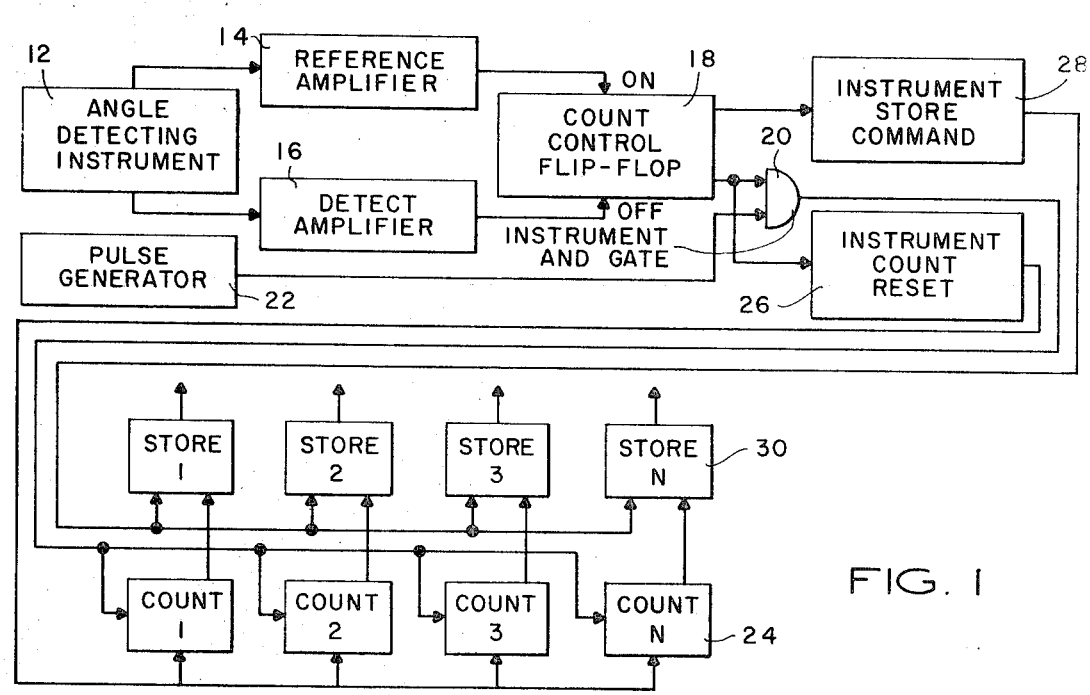
FIG. 1 is a schematic of an electrical circuit including an instrument system for detecting wellbore parameters and storing data bits indicative thereof.

The data transmission system, which is the subject of this invention is described in conjunction with an instrument system for use within a borehole. The disclosed instrument system detects positional parameters of the borehole and transmits such data to the surface. At the surface, the data is processed and recorded in a form for making computations thereon. FIG. 1 shows a schematic circuit diagram which includes downhole equipment for detecting a wellbore parameter and generating signals indicative thereof. The instrument 12 is described herein as being an angle detecting unit, but of course can be any number of wellbore apparatuses for measuring parameters indicative of wellbore conditions. The instrument 12 which is not disclosed in detail, may be such that it features a scanning system for producing first and second signals with the time between such signals being determinative of the angular inclination of the instrument within the wellbore. Such an instrument system is disclosed in applicant's copending application titled "BOREHOLE DATA TRANSMISSION SYSTEM" which is filed the same date as this application. The apparatus described therein utilizes photoconductive cells for generating two signals upon each cycle of a scanning apparatus. The time lapse between generation of such signals is directly proportional to the parameter to be measured in the wellbore. The first signal is called a reference signal, whereas the second signal, which is time spaced therefrom in proportion to such parameter, is called the detector signal.

The signals which are generated in the instrument scanning system are passed through respective amplifiers 14 and 16 which in turn shape each of the signals and pass them on to a count control flip flop 18. The reference amplifier signal triggers "on" the flip flop 18 which in turn has a number of control functions. First, on the rise of the trigger "on" signal from the reference amplifier, that is, as the output of amplifier 14 rises to a positive potential, the flip flop 18 provides an output signal. A first control function of the count control flip flop is to provide a gate control signal to an instrument "AND" gate 20. A second input to the instrument "AND" gate 20 is comprised of continuous pulses that are generated by a pulse generator 22. The pulses from the pulse generator have been shaped and multiplied such that the input frequency of pulses to the gate is, for example, for the instrument described herein, 36,000 pulses per second. Therefore, when a signal is received from the count control flip flop 18 into the instrument "AND" Gate 20, the gate will pass the oncoming pulses from the pulse generator that appear on its other input, such pulses being passed to the binary counting units 24. Thereafter in the instrument, when the scanning mechanism has moved to its detection position, a signal is generated and passed through the detector amplifier 16 to the count control flip flop 18 and causes the flip flop to turn off. This in turn removes the potential from one leg of the instrument "AND" gate 20, causing it to stop passing pulses from the pulse generator to the counting units 24.

A second control function of the count control flip flop 18 occurs upon the rise of the trigger "on" signal from the reference amplifier, that is, as the output of the amplifier 14 rises to a positive potential, the flip flop 18 sends an output signal to a count reset circuit 26, which also is an amplifying and pulse shaping circuit. The output of the count reset circuit is a 5 microsecond pulse that resets the binary counting units 24 to zero. The binary counting units for receiving the output of the instrument gate 20 are in the form of a series of flip flops in ripple count configuration to provide a bit counter.

At the time that the count control flip flop 18 turns off in response to a signal from the detector amplifier 16, its decaying signal provides still a third control function. The decaying signal activates an instrument store command circuit 28, which is an amplifying and pulse shaping circuit. The output of the store command circuit is a 5 microsecond pulse that commands memory or storage units 30 in association with the counting units 24 to store all the contents of the counting units 24. The storing units 30 are a series of flip flops slaved to look at information in the counter on command from the storage command, and to store either a one or zero, that is, a voltage or no-voltage, which is present in the associated counter 24 at the time. Thus, the counters are continuously gathering data from the instrument and on command, storing it.

To review the operation of the electrical circuitry thus far described, the instrument scanning system provides a first signal upon activation of a reference photocell (not shown) to pulse a count control flip flop 18. The output of flip flop 18 operates a gate 20, which when operated, passes pulses from pulse generator 22 to a ripple counter 24. The scanning system in the instrument 12 then provides a second signal upon activation of a detector photocell (not shown). The second signal turns count control flip flop 18 off, and thus closes "AND" gate 20 to stop pulses to the ripple counter 24. The decaying signal from the count control flip flop generates a signal in the store command circuit 28, which in turn activates the storage units 30 to store the binary information in the ripple counter. Thus, every time the scanning system measures the angular distance between the reference and detector photocells, pulses in timed proportion to such angular distance operate the ripple counter and the count is then stored.

The method for relating such pulse count to angular measurement can be illustrated. For example, if the scanner takes 1½ seconds to move from the reference photocell to the detector photocell, the flip flop will be outputting a signal for 1½ seconds. During this time span, 18,000 pulses from the pulse generator will be passed by the gate 20 to the data counter 24. The instrument scan mechanism is arranged to make a complete scan once every 3 seconds. The scanner will then have moved in 1½ seconds over an arc of 180°, thus the detector photocell is located 180° from the reference photocell. This instrument is arranged so that such a reading indicates that the detector housing is in a vertical position.

Figure 2:
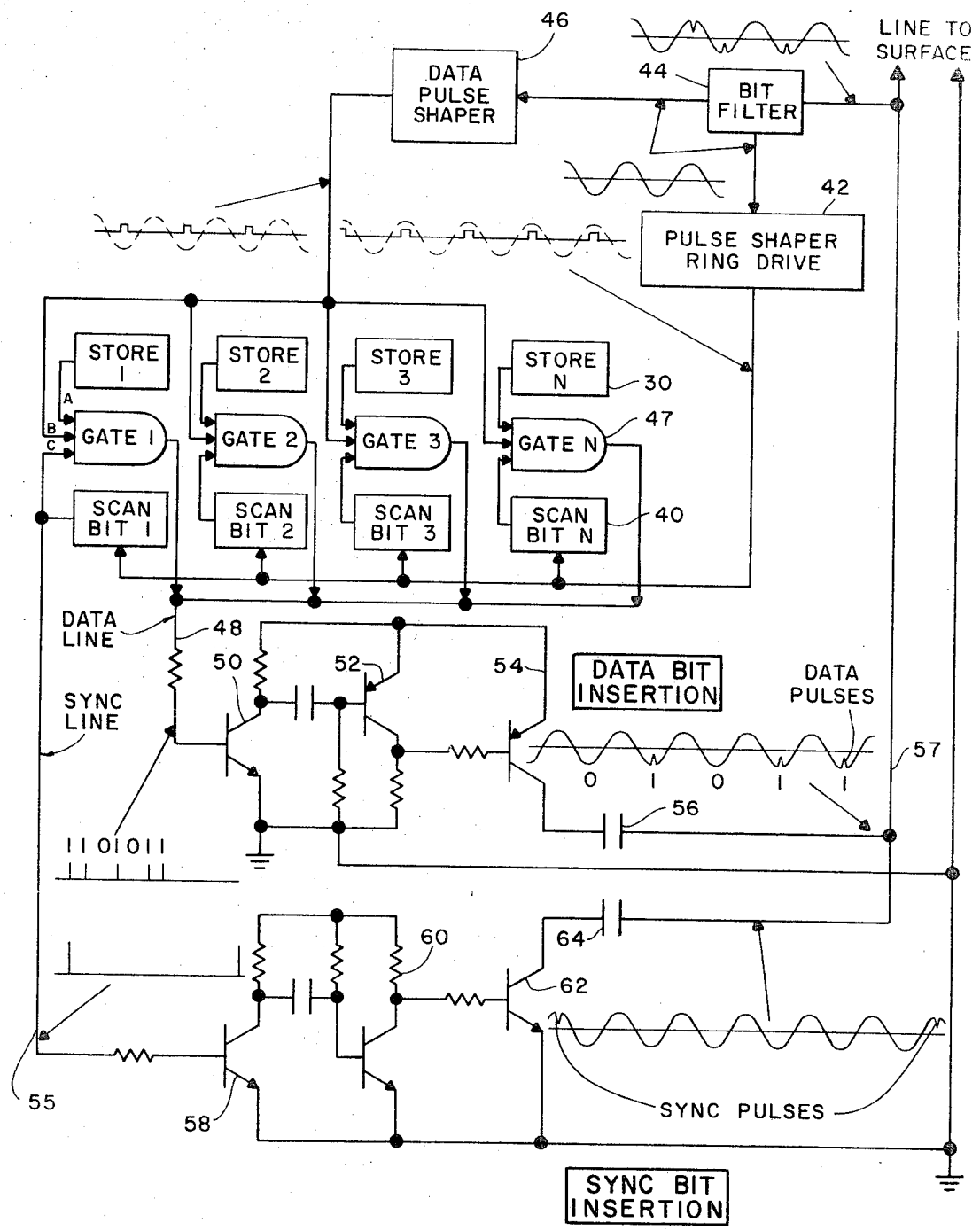
FIG. 2 is a schematic circuit diagram of a system for inserting data onto a conductor for transmission to a remote location.

The next step is to transfer the information contained in the storage units 30 in a logical form over a single conductor cable that is also being used to send high voltage 110 volt, 60 cycle power to the instrument system just described. Referring next to FIG. 2 of the drawings, the circuit used to transfer the information stored in the memory of the system consists of a series of DC flip flops 40, also termed scan bits, which are arranged in a ring configuration. Only the first three and the "nth" scan bits are shown in block diagram to simplify the drawing, however it is understood that any number may be arranged in such a ring configuration, depending upon the number of logic bits needed. Of all such flip flops 40, only one output can be high at a time, that is, have voltage, while all the others will be low or at zero. When a clock pulse is fed to the scan bit circuits from a ring drive 42, the high output will sequence a step to the next flip flop.

To simplify bit insertion or data insertion on the power line, it is desirable to drive the scan bit with the power frequency. This also synchronizes the data pulses with the line frequency period. The reason for this will be apparent hereinafter.

The circuit diagram of FIG. 2 shows a portion of the AC signal, which is used to power the downhole instrument system, being tapped off the line and sent to a bit filter 44. The line signal at this point has already been pulsed by data logic from a scan bit insertion circuit (an operation to be hereinafter described). Therefore, in order to use the line signal for control purposes, it is desirable to filter any bits of information or other spurious signals and send a clean signal of power line frequency to the ring drive circuit 42 and also to a data pulse shaper 46. The ring drive circuit is in the form of a pulse shaping circuit which is driven by the resulting sine wave from the bit filter circuit 44. The ring drive circuit 42 removes the 60 cycle sine wave, and in synchronization with the wave, places a narrow square wave pulse (1 millisecond) on the line at a plus 90° position as shown diagrammatically in FIG. 2. This square wave pulse is fed to the scan bit ring counter to step the ring counter one step for each pulse. The ring drive, in other words, selects the positive going portion of the signal and shapes it into a 1 millisecond wide pulse that occurs at 90° with respect to the 360° period of the signal. This pulse occurs at every 360° period of the signal. This of the line frequency and is used to drive the scan bit ring counter 40.

The data pulse shaper 46 which receives a clean sine wave signal from the bit filter 44 is in the form of a pulse shaping circuit which is driven by the sine wave from the bit filter 44. The data pulse shaper 46 selects a negative going portion of the incoming signal and shapes it into a 1 microsecond pulse that occurs in correspondence with the negative portion of the line frequency at 270° with respect to the 360° period of the signal. These pulses are occurring at the same frequency as those emerging from the pulse shaper ring drive 42, but they occur at different points on the period of the line power. The pulses from the data pulse shaper are sent to bit gates 47 which are designated 1 to N. Bit gates 47 are three input "AND" gates associated with each of the scan bit and store units.

Referring to bit gate 1, each of the bit gates has three inputs which are designated A, B, and C. If there is a voltage or 1 on input C which is derived from scan bit 1, and if at the same time there is a voltage on input A from the storage flip flops 30, that is, if there is a 1 stored on the storage unit, then the two positive voltages on input A and C cause the bit gate 1 to open. Opening of the bit gate 47 allows passage of the 270° positive square wave pulse from the data pulse shaper through the bit gate to a data line 48, and from there to a data bit insertion circuit. On the other hand, if either the scan bit 40 has a low voltage or zero, or if the storage unit 30 has a zero voltage, then the associated bit gate 47 does not pass the data pulse, so that no pulse is received on the data line at that point of time on the line signal. The ring drive 42 steps the scan bits from 1 through N, with the same process taking place as set forth above, so that when the gate bit associated with a scan bit sees a voltage in the associated storage unit, this causes a pulse from the data pulse shaper 46 to pass on to the data line 48 and thus to the data bit insertion circuit. When the Nth bit has been read, the ring counter is of such configuration that it automatically steps to the first scan bit, since the output of scan bit N goes to the input of scan bit 1.

Referring to the "data bit insertion" portion of the circuit in FIG. 2, the data bits which are passed through the gates 47 as the ring steps around the data in memory, are transferred onto the data line and from there to the data bit insertion circuit. These data pulses are positive going pulses at 270° in relation to the power line signal. These pulses are passed onto the base of transistor 50 causing it to go into saturation. Saturation of transistor 50 produces a positive pulse which is passed to the base of transistor 52. Transistor 52 which is arranged in a "one shot" configuration and provides a trigger pulse, with the width of such pulse being in the range of 1 millisecond. The trigger pulse output of transistor 52 is to the base of transistor 54, which is a PNP device, thus requiring a negative collector voltage to conduct. Transistor 54 is a power transistor that has a capacitor 56 in series with the power line for its only collector load. When transistor 54 saturates, it puts capacitor 56 across the line at that moment and causes a pulse to occur on the line voltage. In other words, when capacitor C1 charges through transistor 54, a momentary voltage drop occurs on the line, thus dropping the amplitude toward zero. This in turn provides a spike at that point in the negative going portion of the signal or at the 270° position with respect to the 360° cycle. Since the data pulse is originally on the 270° portion of the power signal, then the output of the "one shot" 52 occurs at the same angular relationship relative to the power signal. This output pulse of "one shot" 52 is used to drive 54 into saturation. Therefore, as the power line frequency goes negative to minus 90° (270°), the "one shot" 52 causes saturation of transistor 54 which puts the spike on the line at that instant of time, that is, at minus 90° (270°).

As the ring counter sequences and gates data onto the data line and into the data bit insertion circuit, a means is provided to indicate one complete sequencing of the ring which will be described herein as "sync pulse insertion." The output of scan bit 1 is provided to a sync line which in turn feeds the sync bit insertion circuit. This latter circuit operates similarly to the data bit insertion circuit described above, except that the power transistor 62 is an NPN device which has to have a positive pulse on its base in order to saturate. The pulse that is passed onto the sync line by the scan bit 1 is the output of the ring drive circuit 42 which in turn is a positive pulse at the plus 90° position of the wave. This pulse is used to saturate transistor 58 which in turn operates a "one shot" 60. One shot 60 triggers a pulse into the base of NPN transistor 62, which causes it to saturate. When transistor 62 saturates, the capacitor 64 which is the only collector load of transistor 62 charges in series with the power line to cause a voltage drop on the power line signal at a point at the plus 90° position, thus providing a spike on the signal to distinguish between the stop and start of any word of information which is read from the storage units.

Using the technique described above, data can be transmitted over very long lines with almost no deterioration or attenuation of the data signal. For example, such transmission has been successful over a cable 20,000 feet long with a resulting data signal of a magnitude of 50 or 60 volts after the power line frequency had been filtered out.

Figure 4:
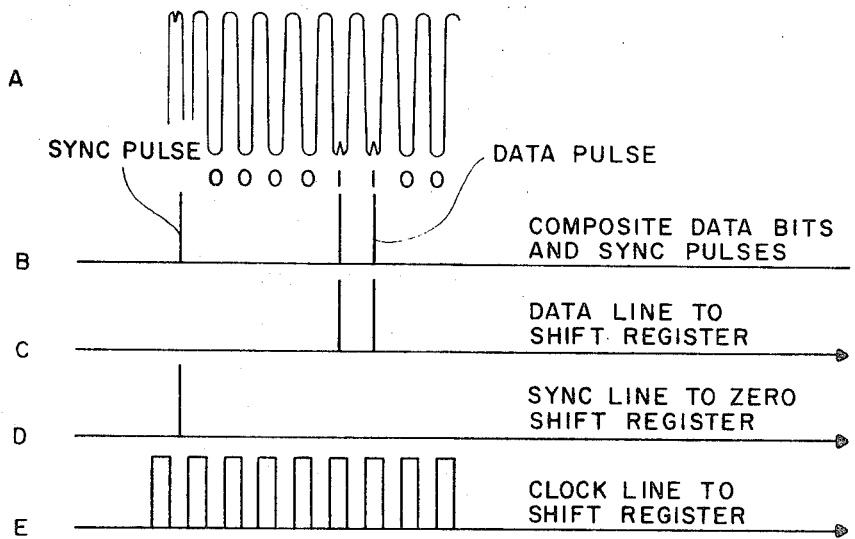
FIG. 4 is a schematic diagram of wave shapes and pulses which occur throughout the system described in FIGS. 1 to 3.
Figure 3:
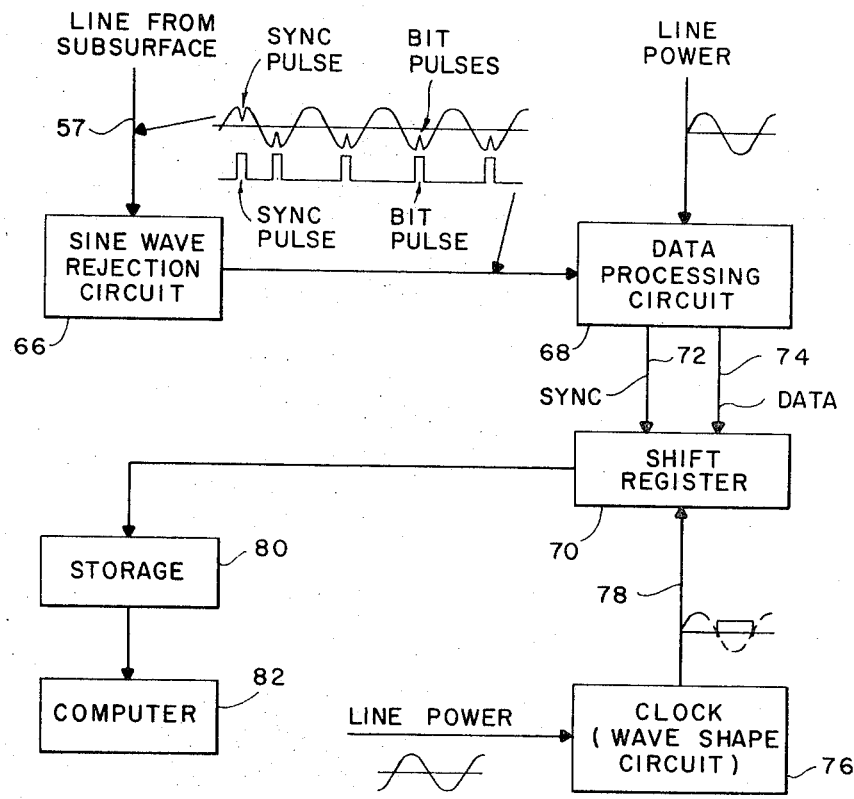
FIG. 3 is a schematic representation of surface equipment for receiving coded data and making computations.

The latter filtering process is described with respect to FIG. 3 of the drawings. At the surface, the composite signal, represented by line A in FIG. 4, is passed through a data processing system as shown in FIG. 3 of the drawings. Referring to FIG. 3, the line 57 from the sub-surface equipment is shown connecting with a sine wave rejection circuit 66. The sine wave rejection circuit rejects the 60 cycle component of the sine wave to provide data pulses as represented by line B in FIG. 4. The resulting data pulses which are synchronous with the 270° position on the line signal, and sync pulses which are synchronous with the 90° position, are then sent to a data processing circuit 68. In the data processing circuit, the sync pulses are separated from the data pulses by comparing the pulses with the line frequency. Those pulses that occur in correspondence with the positive 90° portion of the signal are separated from those that occur on the minus 90° (270°) portion, and put on separate lines 72 and 74 corresponding respectively with sync and data pulses.

The data pulses thus emerge from the data processing circuit on line 74 as represented by line B in FIG 4. A line frequency is also fed to a clock or wave shaping circuit 76 which shapes the negative 90° (270°) portion of the line frequency into a positive going square wave pulse, as represented schematically on line 78 and line E of FIG. 4. This square wave pulse is used as a clock signal to shift the incoming data pulses on line 74 into a shift register 70. The shift register stores the binary data in the form it is received from the downhole count and store system, thus retaining the identity of the number counted by the system at the downhole location. The synchronous pulses emerging from the data processing unit on line 72 are used to reset the shift register to zero. The output from the shift register is sent to a storage system 80 within a computer 82 for performing calculations on the accummulated data determinative of instrument information.

Although described with respect to surface recording of downhole wellbore data, it is readily seen that the apparatus described herein would be compatible for use with various kinds of equipment wherein it is desirable to transmit data from one place to another in a manner similar to that described herein. Therefore, while particular embodiments of the present invention have been shown and described, it is apparent that changes and modifications may be made without departing from this invention in its broader aspects, and therefore, the aim in the above description is to cover all such changes and modifications as fall within the true spirit and scope of this invention.

What is claimed is:

1. In a borehole system having borehole means for providing logic data signals and for transmitting such logic data signals over a single conductor to the surface: borehole means for storing said logic data signals; single conductor means for supplying a power signal from the surface to said borehole means; means for detecting said stored logic data signals and superimposing said detected logic data signals on said power signal; and surface means for separating said logic data signals from said power signal.

2. The system of claim 1 and further including means for generating second logic signals and means for superimposing said second logic signals on said power signal in phase spaced relationship.

3. The system of claim 2 wherein said second logic signals are superimposed on said power signal to separate portions of said logic data signals superimposed thereon.

4. The system of claim 3 and further including surface means for separating said logic data signal and second logic signal from said power signal and means for comparing said logic data signals and second logic signal with said power signal to differentiate between said logic signals.

5. A circuit system for inserting logic signals on a conductor including: means for providing a line signal on said conductor; means for providing a logic signal to said circuit system; switch means responsive to said logic signal for providing an output pulse in time relation with a fixed predetermined phase position on said line signal; and reactive means positioned between and in series with said switch means and said conductor for inserting a logic signal on said conductor in phase relation with said fixed predetermined phase position.

6. In a circuit system for inserting logic signals on a conductor, including: means for providing a line signal on said conductor; means for providing data logic signals to said circuit system; means for providing synchronization logic signals to said circuit system, said data logic signals being time coordinated with a first position on the line signal, said synchronization logic signal being time coordinated with a second position on the line signal which is phase spaced from said first position; means responsive to said data logic signal for superimposing a pulse on said line signal at a first fixed predetermined phase position; and means responsive to said synchronization logic signal for superimposing a pulse on said line signal at a second fixed predetermined phase position.

7. The system of claim 6 wherein said first and second predetermined phase positions are of opposite polarity.

8. The system of claim 7 wherein said superimposing means are each comprised of solid state switch means and reactance means positioned between and in series with said conductor and switch means, with said solid state switch means having said reactance means as its collector load.

9. The system of claim 6 wherein said line signal is an alternating current wave and said first and second predetermined phase positions correspond with the positive and negative peak amplitudes of said line signal.

10. In a circuit system for inserting logic signals on a conductor to transmit data to a spaced location and remove such data, including: means for said providing a line signal on said conductor; means for providing data logic signals to said circuit system; means for providing synchronization logic signals to said circuit system, said data logic signals being time coordinated with a first position on the line signal, said synchronization logic signal being time coordinated with a second position on the line signal which is phase spaced from said first position; means responsive to said data logic signal for superimposing a pulse on said line signal at a first predetermined phase position; means responsive to said synchronization logic signal for superimposing a pulse on said line signal at a second predetermined phase position; and means at such spaced location for rejecting said line signal and generating pure pulses corresponding with said first and second predetermined phase positions.

11. The system of claim 10 and further including means at such spaced location for comparing said pure pulses corresponding to said first and second predetermined phase positions with the phase polarity of said line signal to differentiate between said pulses at said first and second positions.

12. The apparatus of claim 11 and further including means responsive to the variations of said line signal for registering and storing logic bits to corresponding to said differentiated pulses.

13. A borehole data system for transmitting logic data from a downhole location to a spaced location over a single conductor path including: downhole detecting means for determining a parameter; means for providing a line signal to said downhole detecting means via the single conductor path; means responsive to said downhole detecting means for providing a logic signal to said system; means for superimposing said logic signal on said line signal in a fixed predetermined phase relation with said line signal; and means at the spaced location for detecting said superimposed logic signal in its fixed predetermined phase relation with said line signal.

14. The system of claim 13 wherein said logic signal is comprised of a plurality of events, with each of said events having a predetermined phase relation.

15. The system of claim 14 wherein said detecting means at the spaced location includes clock means for separating said events according to their predetermined phase relation.

16. The system of claim 13 wherein said superimposing means includes a semiconductor arranged to provide a characteristic mark on the line signal when the semiconductor changes it conductive state.

* * * * *